United States Patent
Seok et al.

(10) Patent No.: US 11,464,027 B2
(45) Date of Patent: Oct. 4, 2022

(54) EXTREMELY HIGH THROUGHPUT (EHT) MULTI-BAND TRANSMISSION

(71) Applicant: MediaTek Singapore Pte. Ltd., Solaris (SG)

(72) Inventors: Yongho Seok, San Jose, CA (US); Jianhan Liu, San Jose, CA (US); Gabor Bajko, San Jose, CA (US); James Chih-Shi Yee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/552,420

(22) Filed: Aug. 27, 2019

(65) Prior Publication Data
US 2020/0077417 A1  Mar. 5, 2020

Related U.S. Application Data

(60) Provisional application No. 62/723,539, filed on Aug. 28, 2018.

(51) Int. Cl.
*H04W 4/00* (2018.01)
*H04W 72/12* (2009.01)
(Continued)

(52) U.S. Cl.
CPC ........... *H04W 72/1215* (2013.01); *H04L 5/14* (2013.01); *H04W 28/04* (2013.01); *H04W 84/12* (2013.01); *H04W 88/06* (2013.01); *H04W 88/10* (2013.01)

(58) Field of Classification Search
CPC ....... H04L 1/08; H04L 1/1835; H04L 1/1841; H04L 1/1867; H04L 5/14; H04L 45/24;
(Continued)

(56) References Cited

U.S. PATENT DOCUMENTS 8,345,588 B2 *  1/2013  Adachi ................. H04W 48/08
                                                                370/315
8,473,732 B2 *  6/2013  Ptasinski ............... H04W 12/03
                                                                713/150

(Continued)

FOREIGN PATENT DOCUMENTS

JP   2017-118557 A   6/2017

OTHER PUBLICATIONS

Liu et al., EHT Multi-link Operation, IEEE 802.11-19/0731r0, 17 pages, May 2019.*
(Continued)

*Primary Examiner* — Frank Duong

(57) ABSTRACT

System and method of cooperative multi-band wireless STA communication that enables full duplex operations. Frames are configured to carry band information and are selected to be transmitted simultaneously in multiple bands based on various constraints to avoid out-of-order delivery. For frames under a block ACK agreement, a transmit STA can specify the transmission bands for the frames in an ADDBA request frame. While a first band is transmitting a first frame under a block ACK agreement, the second band can be used to transmit a frame under the same block ACK agreement as, and from the same traffic flow with, the first frame. Otherwise, the second band can only be used to transmit a frame with a different TID than the first frame.

16 Claims, 13 Drawing Sheets

(51) Int. Cl.
*H04L 5/14* (2006.01)
*H04W 28/04* (2009.01)
*H04W 88/10* (2009.01)
*H04W 84/12* (2009.01)
*H04W 88/06* (2009.01)

(58) Field of Classification Search
CPC . H04L 47/14; H04L 47/34; H04L 2001/0093; H04W 28/04; H04W 84/12; H04W 88/06; H04W 88/10; H04W 72/12; H04W 72/1215
See application file for complete search history.

(56) References Cited

U.S. PATENT DOCUMENTS

| | | | | |
|---|---|---|---|---|
| 8,599,813 | B2* | 12/2013 | Cordeiro | H04L 5/0064 370/338 |
| 9,420,490 | B2* | 8/2016 | Jia | H04L 5/001 |
| 10,893,437 | B2* | 1/2021 | Wang | H04W 28/0205 |
| 10,992,603 | B2* | 4/2021 | Yong | H04L 47/2483 |
| 11,076,385 | B2* | 7/2021 | Huang | H04W 72/005 |
| 2011/0261754 | A1 | 10/2011 | Trainin | |
| 2014/0254349 | A1* | 9/2014 | Jia | H04W 28/0252 370/216 |
| 2016/0165607 | A1 | 6/2016 | Hedayat | |
| 2016/0277170 | A1 | 9/2016 | Jia et al. | |
| 2017/0048048 | A1* | 2/2017 | Seok | H04L 5/0007 |
| 2017/0055300 | A1* | 2/2017 | Pitchaiah | H04L 1/1621 |
| 2017/0279864 | A1 | 9/2017 | Chun et al. | |
| 2017/0311204 | A1 | 10/2017 | Cariou et al. | |
| 2018/0054847 | A1 | 2/2018 | Cariou et al. | |
| 2018/0183723 | A1* | 6/2018 | Cariou | H04L 12/4633 |
| 2018/0205502 | A1* | 7/2018 | Merlin | H04W 72/085 |
| 2018/0206174 | A1 | 7/2018 | Zhou et al. | |
| 2019/0335454 | A1* | 10/2019 | Huang | H04W 72/048 |
| 2019/0342916 | A1* | 11/2019 | Liu | H04B 17/336 |
| 2019/0364555 | A1* | 11/2019 | Huang | H04W 72/048 |
| 2020/0037324 | A1* | 1/2020 | Chu | H04W 72/0453 |

OTHER PUBLICATIONS

IEEE Standard for Information technology—Telecommunications and information exchange between systems—Local and metropolitan area networks—Specific requirements, Pad 11: Wireless LAN Medium Access Control(MAC) and Physical Layer(PHY) specifications, Amendment 8: Medium Access Control(MAC) Quality of Service Enhancements, IEEE Std 802.11e TM-2005, NY, USA, 2005, XP017603828.

802.11-2016—IEEE Standard for Information technology—Telecommunications and information exchange between systems Local and metropolitan area networks—Specific requirements—Part 11:Wireless LAN Medium Access Control (MAC) and Physical Layer (PHY) Specifications Dec. 14, 2016,pp. 3-1199.

* cited by examiner

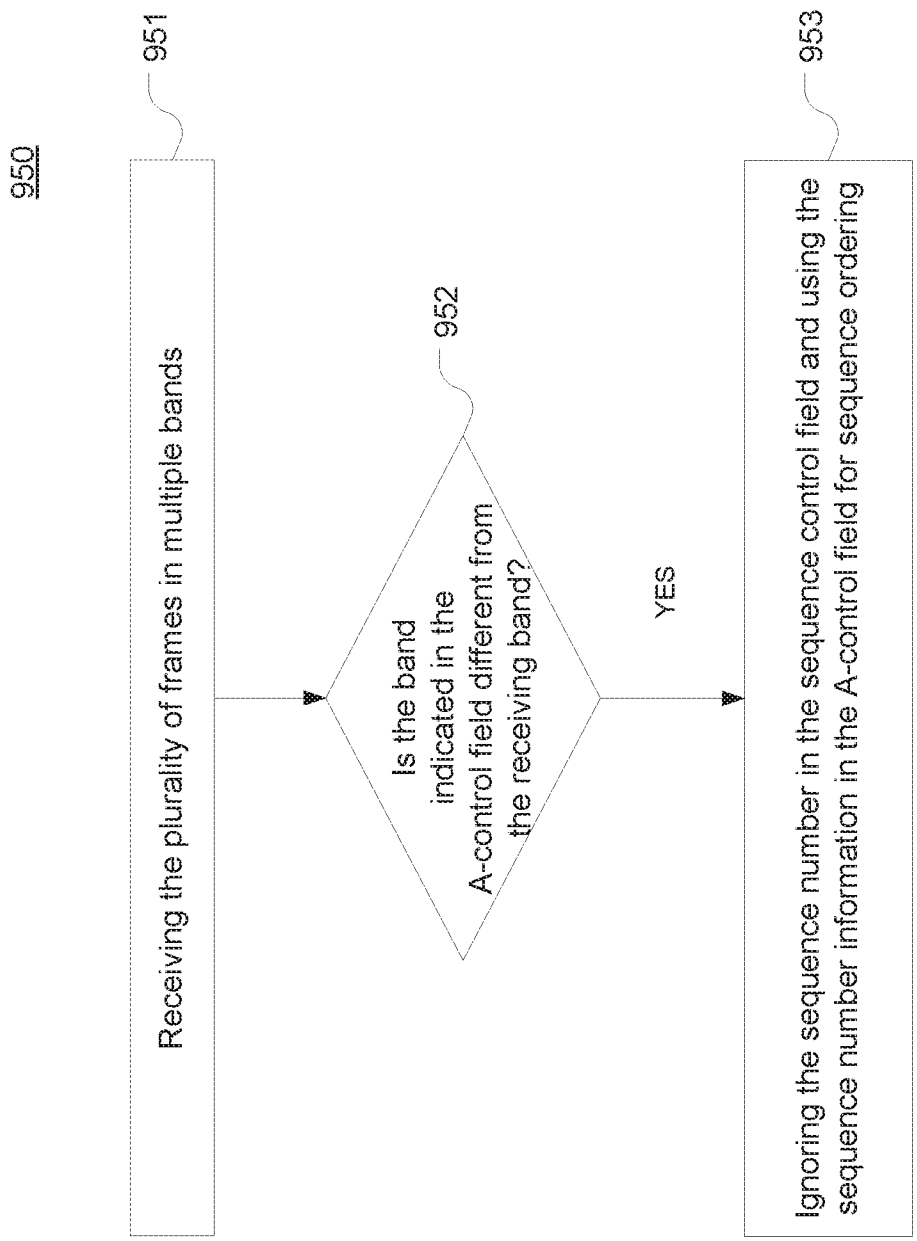

EXTREMELY HIGH THROUGHPUT (EHT) MULTI-BAND TRANSMISSION

CROSS REFERENCE TO RELATED APPLICATION

This patent application claims priority and benefit of: the U.S. Provisional Patent Application No. 62/723,539, entitled "Multi Band Transmission," filed on Aug. 28, 2018, the entire content of which is herein incorporated by reference for all purposes.

TECHNICAL FIELD

Embodiments of the present disclosure relate generally to the field of wireless network communication, and more specifically, to the field of multi-transceiver wireless local area network (WLAN) STA communication.

BACKGROUND OF THE INVENTION

Current wireless stations (STAs) compliant with predominant WLAN communication protocols are built for half-duplex operations: two stations (STAs) can communicate with each other, but cannot transmit simultaneously. That is, between two communicating STAs, data can only be transmitted in one direction at a time, usually in a manner of so-called "listen-before-talk."

SUMMARY OF THE INVENTION

Embodiments of the present disclosure are directed to systems and methods of using multiple transceivers, and correspondingly multiple channels, in a single WLAN station (STA), to enable full duplex communication between WLAN STAs, thereby enhancing transmission efficiency, data rate, throughput and flexibility of the WLAN. In such a system, an STA can execute a channel access in multiple WLAN bands independently. In some embodiments, the multiple transceivers and channels in the STA can be used to perform data transmission to peers. A cooperative management unit (CMU) in the STA may exchange or aggregate information between the transceivers such that data or other information may be transmitted or received by using the multiple channels. For example, one channel can offload a transmission or reception task, partially or entirely, to the other channel. A transmit STA can obtain an TXOP for a particular band at one time, or obtain contemporaneous TXOPs in multiple bands to transmit frames in these bands simultaneously and cooperatively.

Embodiments of the present disclosure provide mechanisms of selecting scheduled frames for transmission, in combination with exchanging adequate information between STAs, to ensure correct frame ordering and sequence ordering and to prevent out-of-order delivery among the frames that are received in multiple bands. In some embodiments, for frames under a block acknowledgement (or "ACK" for brevity) agreement, a transmit station (STA) can specify the transmission bands for the frames in an add block acknowledgment (ADDBA) request frame. While a first band is transmitting a first frame under a block ACK agreement, a scheduled frame may be selected for simultaneous transmission in the second band based on its association with the first frame. Particularly, the second band can be used to transmit a frame under the same block ACK agreement as, and from the same traffic flow (e.g., with the same traffic identifier (TID)) with, the first frame. Otherwise, the second band can only be used to transmit a frame with a different TID than the first frame.

In some embodiments, while a first band is transmitting a first frame under no block ACK agreement, a scheduled frame from a different traffic flow may be selected for simultaneous transmission in the second band. A scheduled frame from the same traffic flow may be selected as long as it would not be delivered earlier than the first frame, for example, provided that the first frame has no more retry and its transmission end time is no later than that of the scheduled frame.

In some embodiments, while a first band is transmitting a fragmented frame of a data unit, only one of the remaining frames is eligible for simultaneous transmission in the second band to ensure proper fragment ordering.

For frames under the same block ACK agreement or being fragmented frames of a data unit, the frame order information can be provided to a receive STA to avoid out-of-order delivery. In some embodiments, a single sequence number space is used to encode the sequence number of the frames for transmission in multiple bands. For example, consecutive sequence numbers are set for the frames, starting from a number indicated in the ADDBA request frame. In some embodiments, for fragmented frames of a single data unit to be transmitted in multiple bands, a single sequence number and a single fragment number space are used for the frames.

In some embodiments, the communicating STAs each maintain independent robust security network association (RSNA), security keys, sequence counters and/or packet number (PN) counters for the different bands. To allow the receive STA to receive frames from more than one sequence number space associated with a traffic flow, an aggregated control field (A-control field) of each frame is set to carry band information, e.g., identifying the operating band of the peer MAC entity for which the frame is destined. The receive STA may maintain receive cache indexed by the band as well as a few other frame indices, and may use the sequence control field of the frames for the sequence ordering of the band indicated in the A-control field. For a frame without specifying any band in the A-control field, the STA may assume that the sequence number of the frame is associated with its receive band for purposes of sequence ordering.

In some embodiments, for frames under the same block ACK agreement to be transmitted in multiple bands, the A-control field carries the band information and the sequence number to indicate the frame order. In a frame, if the band information indicated in the A-control field is different from the band indicated in the sequence control field, the receive STA may ignore the sequence control field but use the sequence number in the A-control field for sequence ordering.

In some embodiments, for fragmented frames of a single data unit to be transmitted in multiple bands, the A-control field of each frame carries the sequence number information and the fragment number information. In a frame, if the band information indicated in the A-control field is different from the band indicated in the sequence control field, the receive STA may ignore the sequence control field but use the sequence number and the fragment number in the A-control field for defragment ordering.

In some embodiments, it is prescribed that frames under the same block ACK can only be transmitted in a single band. The band to be used may be initially specified in an ADDBA request frame, and may be changed through a fast session transfer (FST) message exchange.

Embodiments of the present disclosure provide retransmission mechanisms in multi-band operations to prevent out-of-order delivery. In some embodiments, for a frame under no block ACK agreement that is transmitted in one band, retransmission of the frame can only be performed by using the same band. In some other embodiments, the sequence numbers in the sequence control field of the frames have the same value. That is, a single sequence number space is used in the multiple band associated with the STA. In this manner, retransmission of a frame can be performed by using a different band. In some embodiments, for a frame under no block ACK agreement to be retransmitted in a different band than in the original transmission, the A-control field indicates the same sequence number information as the original frame. The STA may maintain independent RSNAs, security keys, sequence counters, and/or PN counters for the multiple bands. The sequence number information can be stored in the receiver cache and used for duplicate detection.

Embodiments of the present disclosure provide mechanisms to prevent redundant duplicate processing of group-addressed frames at the receive end in multi-band operations. In some embodiments, the STA may select one of the received duplicate group-addressed frames to send for upper level processing and discard the rest. The STA and AP may exchange messages to agree on a single transmission and reception band for group-addressed frames. In some embodiments, multiple duplicates of a group-based frame are set to have the same sequence number and transmitted in multiple bands. An AP may send group-addressed frames sequentially. The STA may maintain the receiver cache indexed by a group address as well as a few other factors, which may store information on one or more frames. When the STA receives a group of group-addressed frames in multiple bands, it filters the duplicate group-addressed frames based on the receiver cache.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

FIG. 9B is a flow chart depicting an exemplary process of resolving received frames that are transmitted in a multi-band operation and carry information used to avoid out-of-order delivery in accordance with the second embodiment of the present disclosure.

DETAILED DESCRIPTION

Figure 1:
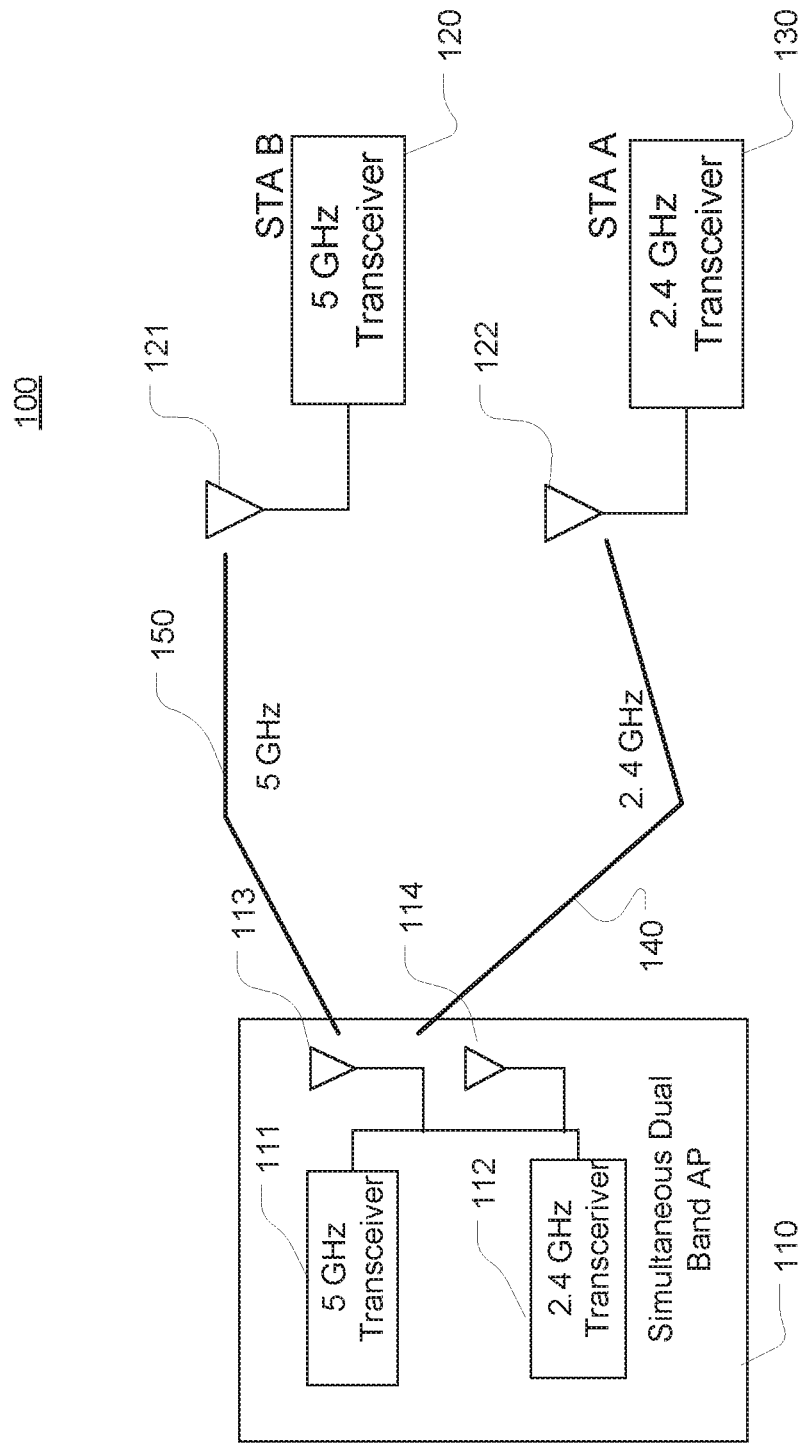
FIG. 1 illustrates an exemplary WLAN in which an exemplary station (STA) has two transceivers and is configured to communicate with the other STAs in full duplex through channels encompassed in two mutually exclusive WLAN bands in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps.

It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the figures is arbitrary for the most part. Generally, the invention can be operated in any orientation.

Encryption Mechanism Used in Multi-Band Channel Access

Embodiments of the present disclosure are described in detail with reference to the formats and structures of Physical Layer Convergence Protocol (PLCP) protocol data unit (PPDUs), data frames, control frames and management frames as defined in the high efficiency (HE) wireless local area (WLAN)-based IEEE 802.11 family of Specifications and Standards. However, the present disclosure is not limited to any specific transmission formats or structures, nor limited to any specific industry standards or specifications.

The IEEE 802.11 standards provide several distinct radio frequency (RF) ranges for use in WLAN communications. These WLAN bands include 900 MHz 2.4 GHz, 3.6 GHz, 4.9 GHz, 5 GHz, 5.9 GHz and 60 GHz bands. Each band is divided into a multitude of channels. Prevalent WLAN devices operate on 26 MHz centered around 915 MHz, about 100 MHz centered around 2.450 GHz and four sub-bands in the 5 GHz band. Currently, Wireless-B and Wireless-G devices operate on 2.4 GHz; and high throughput (HT), very high throughput (VHT), and HE devices can operate on 2.4 GHz and 5 GHz.

Embodiments of the present disclosure can be applied in a cooperative multi-band architecture that enables full duplex operations of wireless stations (STAs). Such an STA includes a WLAN transceiver and one or more additional transceivers. The two transceivers (and the associated channels) operate in mutually exclusive WLAN bands or different types of protocols and therefore can transmit and/or receive simultaneously without signal interference to each other. The multiple transceivers in an STA can perform independent clear channel assessment (CCA) and then simultaneously perform signal transmission or reception jointly or independently. In a cooperative multi-band operation, one channel may be used as an independent assistant channel and is responsible for receiving, collecting, or otherwise supplying, assistant information relevant to a transmission opportunity (TXOP) for the other channel (primary channel) to take various actions with regard to the TXOP. Alternatively, coordinated by a cooperative management unit (CMU) in the STA, the multiple channels in the STA may jointly and simultaneously perform data transmission or reception as peers.

Herein the terms "dual-band," "multi-band," "simultaneous dual-band" or "simultaneous multi-band" "cooperative multi-band" operations or devices may refer to usage of mutually exclusive WLAN bands, such as selected from 2.4 GHz, 5 GHz, and 6 GHz, which naturally does not cause wireless interference issues. The terms may also refer to usage of a WLAN band in combination with another type of wireless protocol, such as Wi-Fi direct, Zigbee, Z wave, Bluetooth, RF, 6LowPAN, or GPRS/3G/LTE.

In some embodiments, a cooperative multi-band operation described herein can be within 5 GHz or 6 GHz band alone. For example, any multiple 20 MHz channels can be aggregated for wideband transmission. In this mode, full duplex may not be allowed. The transmissions on different channels are synchronized.

FIG. 1 illustrates an exemplary WLAN 100 in which an exemplary station (STA) 100 has two transceivers 111 and 112 and is configured to communicate with the other STAs 120 and 130 in full duplex through channels encompassed in two mutually exclusive WLAN bands in accordance with an embodiment of the present disclosure. In this simplified example, the WLAN 100 forms a basis service set (BSS) and includes a dual-band AP 110 and non-AP STAs 120 and 130. According to embodiments of the present disclosure, the dual-band AP 110 is equipped with a 5 GHz and a 2.4 GHz WLAN transceivers 111 and 112, each coupled with an antenna 113 or 114. Through the channels 150 and 140 which are respectively encompassed in the two WLAN bands, the two transceivers can be advantageously actively engaged in signal transmission or reception at the same time without signal interference. In this example, STA A 130 and STA B 120 each have a single transceiver, respectively operating in 2.4 GHz and 5 GHz channels 150 and 140. Thus each STA 120 or 130 only communicates with a corresponding transceiver in the AP 110. At the AP 110, one transceiver can transmit signals in a transmission opportunity (TXOP) while the other one is receiving signals with regard to the same TXOP through non-interfering channels, which in effect advantageously enables the AP to operate in full duplex manner.

In some embodiments, a cooperative management unit (CMU) within the STA is configured to coordinate multi-band operations between the multiple transceivers in the STA. The CMU may function to facilitate information or data exchange between the transceivers, or aggregate or fragment data so that they can be transmitted or received via different bands. In some embodiments, a cooperative multi-band operation involves independent data transmission or reception by using the multiple bands, where data fragmentation or data aggregation may be performed by the CMU. In some embodiments, the CMU can coordinate a multi-band operation in which an STA transmits data packets by using joint coding across all the bands. In some other embodiments, an STA can transmit data packet by using independent coding on each band. In this case, multiple encoders and decoders are needed in the STA. In some embodiments, one channel is used as an auxiliary (referred to as "independent assistance channel (IAC)" herein) and provides assistance information to the primary channel, such as reporting channel conditions and buffer status.

Figure 2:
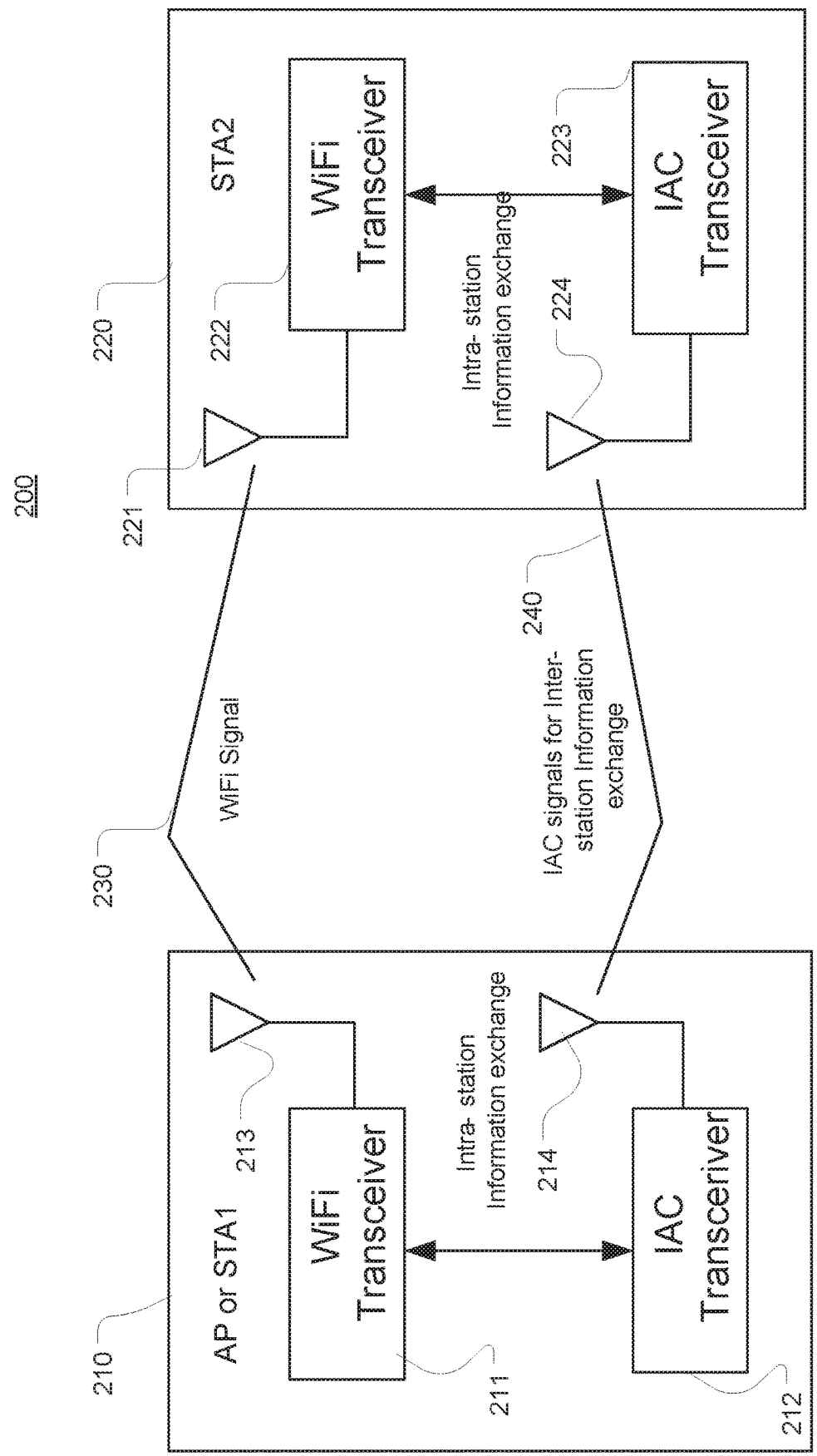
FIG. 2 illustrates an exemplary WLAN in which an exemplary dual-band STA has two transceivers and is configured to communicate with another dual-band STA in full duplex in accordance with an embodiment of the present disclosure.

FIG. 2 illustrates an exemplary WLAN 200 in which an exemplary dual-band STA 210 has two transceivers 211 and 212 and is configured to communicate with another dual-band STA 220 in full duplex in accordance with an embodiment of the present disclosure. Each STA 210 or 220 can transmit and receive at the same time, and can be either an AP STA or a non-AP STA. Each transceiver 211, 212, 222 or 223 in an STA 210 or 220 is operable to communicate with a corresponding transceiver in the other STA which uses the same WLAN band and/or the same protocol. Each transceiver is associated with an antenna 213, 214, 221 or 224.

In this example, the WLAN transceivers 213 and 222 are used for the primary channel 230 for data communication while the transceivers 212 and 223 are IAC transceivers used for the IAC 240. In some embodiments, the IAC transceivers 212 and 223 may be WLAN transceivers operating on different WLAN bands than the primary transceivers 211 and 222. In some other embodiments, the IAC transceivers 212 and 223 may operate on a different transmission mechanism, such as ultra-wide band transmission, or a frequency hopping scheme. Particularly, the transceivers 212 and 223 can be a different type of transceiver, such as a Wi-Fi direct, Zigbee, Z wave, Bluetooth, RF, 6LowPAN, or GPRS/3G/LTE transceiver.

When the two channels in separate bands are all CCA clean, one channel is used as the IAC to assist the transmissions on the other channel. The two transceivers in each STA perform independent CCA on the mutually exclusive channels prior to a multi-band operation. For example, CCA on a channel in 2.4 GHz band and CCA on a channel in 5 GHz band.

During operation, WLAN signals and the IAC signal can be transmitted simultaneously in the WLAN 200 because the transmissions are performed on separate channels and separate transceivers. Particularly, the IAC may be used to exchange control or other assistance information between the STAs 210 and 220 and supply the information to the primary transceivers via intra-station information exchange. The assistance information can be utilized by the primary transceivers to take actions for various purposes, as described in greater detail below. In some embodiments, the assistant information provided by the IAC transceivers is not essential to the WLAN operations. If such information is not supplied correctly, the WLAN can fall back to use only the primary channel and operate in the conventional way.

By using multi-band operations, an individual STA can receive and transmit at the same time, and therefore there is no need for "listen-before talk" or "time-controlled listen-before-talk." This can significantly and advantageously enhance the efficiency of the WLAN.

In a cooperative multi-band operation, an STA may obtain simultaneous TXOPs in multiple bands for transmitting multiple frames simultaneously. To establish such an operation, an AP and a non-AP STA may first exchange information to designate the operating bands to be used for transmitting. For transmitting frames under a block ACK agreement, a transmit STA may send an add block acknowledgment (ADDBA) request frame which includes a traffic identifier (TID) of the frames and indicates the bands on which the STA sends the specific frames. The information may be specified in more than one multi-band information elements in the ADDBA request form.

Figure 3:
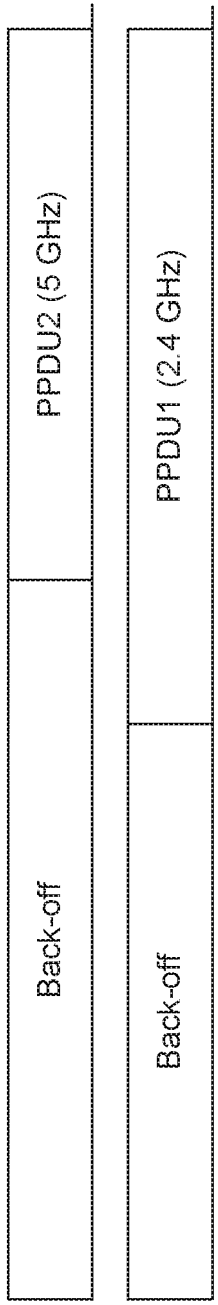
FIG. 3 illustrates the timing diagrams of transmitting two PPDUs concurrently in two bands from an STA.

When a frame is in transmission to, or from, an STA in one band, the STA may select a scheduled new frame to transmit by using another band. FIG. 3 illustrates the timing diagrams of transmitting two PPDUs concurrently in two bands from an STA. As shown, after the respective back-off periods expire, PPDU1 and PPDU2 are transmitted in the 2.4 GHz and the 5 GHz bands.

Figure 4:
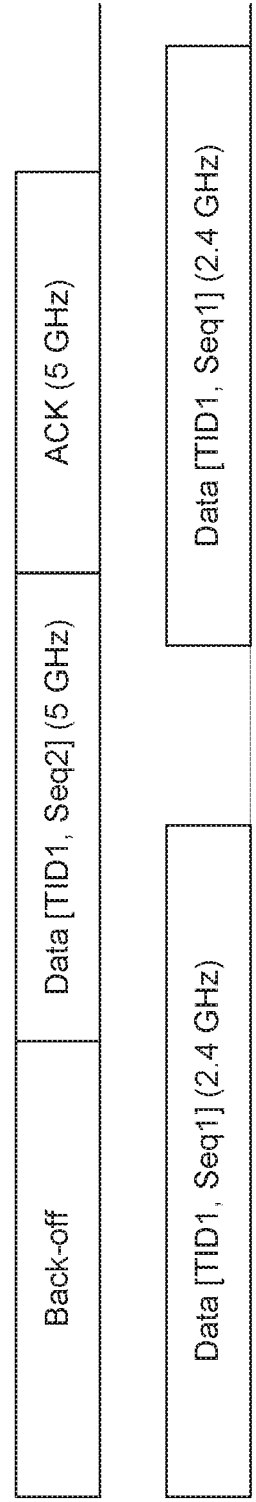
FIG. 4 illustrates the timing diagrams of transmitting and retransmitting frames having the same TDI in a multi-band operation which results in undesirable out-of-order delivery.

Using multiple bands to transmit the same traffic flow may undesirably result in out-of-order delivery of the frames due to various reasons. FIG. 4 illustrates the timing diagrams of transmitting and retransmitting frames having the same TID in a multi-band operation which results in undesirable out of order delivery. In this example, there is no block ACK agreement for TID1. The STA transmits data frames of Seq1 and Seq2 of TID1 on the 2.4 GHz and 5 GHz bands simultaneously. The data frame of Seq1 first transmitted in the 2.4 GHz band has failed, and so the STA retransmits the data frame of Seq1 in the same band. Due to retransmission, the Seq1 frame arrives at the receive STA later than the Seq2 frame. As a result, the receive STA delivers the Seq2 frame to upper layer logic for processing before it delivers the retransmitted Seq1 frame the upper layer, which is out-of-order.

Figure 5:
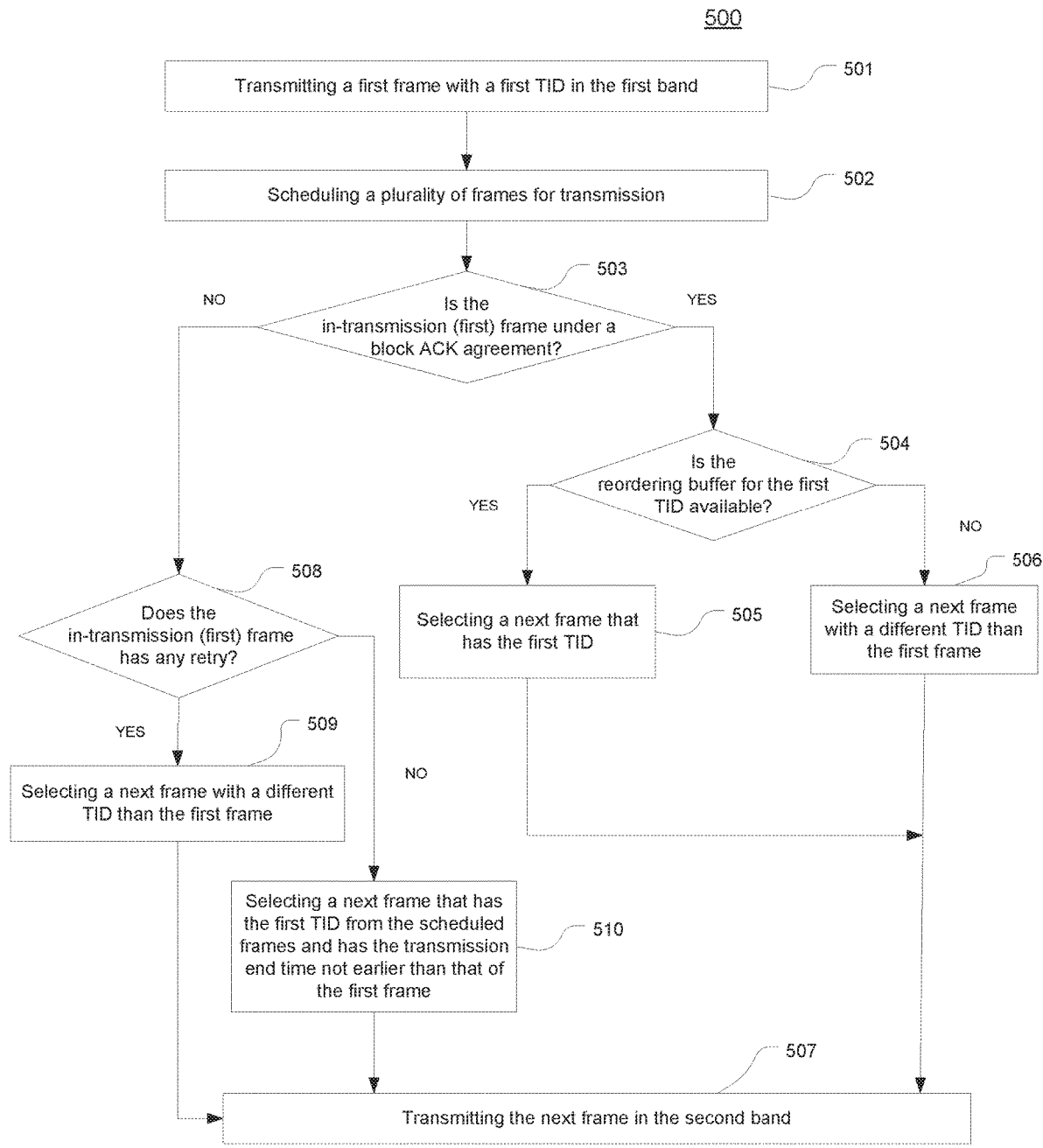
FIG. 5 is a flow chart depicting an exemplary process of selecting frames for transmission to avoid out-of-order delivery in a cooperative multi-band operation in accordance with an embodiment of the present disclosure.

According to embodiments of the present disclosure, to avoid out of order delivery, a scheduled frame is selected for transmission in a band based on their specific relation with an in-transmission frame in another band. FIG. 5 is a flow chart depicting an exemplary process 500 of selecting frames for transmission to avoid out of order delivery in a cooperative multi-band operation in accordance with an embodiment of the present disclosure. Process 500 may be performed by a multi-transceiver transmit STA which may be an AP STA or a non-AP STA. At 501, a first frame with a first TID is being transmitted in the first band. At 502, a plurality of frames are scheduled for transmission. The STA then selects a next frame to transmit on the second band in contemporaneous with the first frame transmission. At 503, it is determined whether the first frame in-transmission is under a block ACK agreement. In some embodiments, the transmit STA can select a scheduled frame that has the same TID as the first frame only if the reordering buffer maintained at the received STA for the TID is available. Otherwise, the STA is limited to selecting a scheduled frame with a different TID than the first frame. Therefore, at 504, it if further determined whether the reordering buffer for the first TID is available. If yes, the next frame is selected from the scheduled frames with the first TID at 505; otherwise, at 506, the next frame is selected from the scheduled frames with a different TID. The selected frame is then transmitted in the second band at 507.

If the in-transmission frame in the first band is under no block ACK agreement, the next transmitted frame can have the same TID as the first frame as long as (1) the in-transmission frame has no more retry, and (2) the next frame would not be delivered earlier than the in-transmission frame. Otherwise, the next frame should have a different TID. Accordingly, if it is determined at 503 that the first frame in-transmission is under no block ACK agreement, at 508, it is further determined whether the first frame has any further retry. If there is no retry for the first frame, at 510, the STA can select a scheduled frame which has the first TID and has its transmission end time no earlier than that of the first frame. For example, if the first frame has the acknowledgement policy field ("ACK Policy" field) set as "no acknowledgement," the frame is treated as "no retry." If a retry is pending at 509, the STA selects a scheduled frame with a different TID as the next transmission frame.

In some other embodiments, if the first frame in-transmission in under no block ACK agreement, the STA may only select as scheduled frame with a different TID than the first frame for transmission in the second band.

Figure 6:
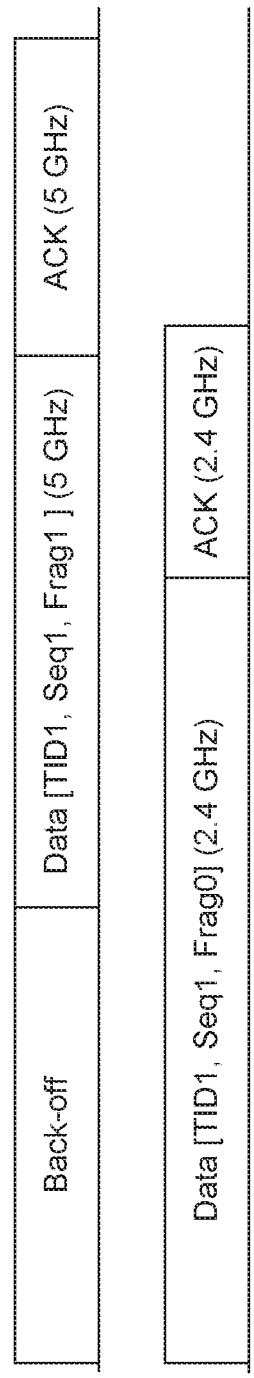
FIG. 6 illustrates the timing diagrams of transmitting fragmented frames in different bands in a multi-band operation in accordance with an embodiment of the present disclosure.

If the in-transmission frame is a fragmented frame of a data unit, e.g., a MAC Service Data Unit (MSDU), the STA may select a remaining fragmented frame of the same data unit from the scheduled frames for transmission in the second band. FIG. 6 illustrates the timing diagrams of transmitting fragmented frames in different bands in a multi-band operation in accordance with an embodiment of the present disclosure. The two fragmented frames have the same TID (TID1) and sequence ID (Seq1) and are transmitted on the 2.4 GHz band and the 5 GHz band, respectively.

For frames under the same block ACK agreement, or being fragmented frames of the same data unit, are transmitted by using multiple bands, the correct sequence number information that represents the frame is provided to a receive STA to avoid out of order delivery.

In some embodiments, for frames are under the same block ACK agreement to be transmitted in multiple bands, their sequence numbers are set to be consecutive values. Particularly, the sequence number subfield in the sequence control field (see FIG. 7) of the frames is set as one of the consecutive values starting from a value specified in the ADDBA Request frame, for example starting from the value in the starting sequence number subfield of the block ACK starting sequence control field in ADDBA Request frame. It means a single sequence number space is used for encoding the sequence number (sequence number subfield value) of the frames transmitted in multiple bands.

For fragmented frames of a single MSDU to be transmitted in multiple bands, a that single sequence number and a single fragment number space can be used to ensure correct delivery frame order. Particularly, the sequence number subfield in sequence control field of each frame is set to the same value, and the fragment number subfield in sequence control field of each frame is set to a value representing its fragment position in the MSDU.

Figure 7:
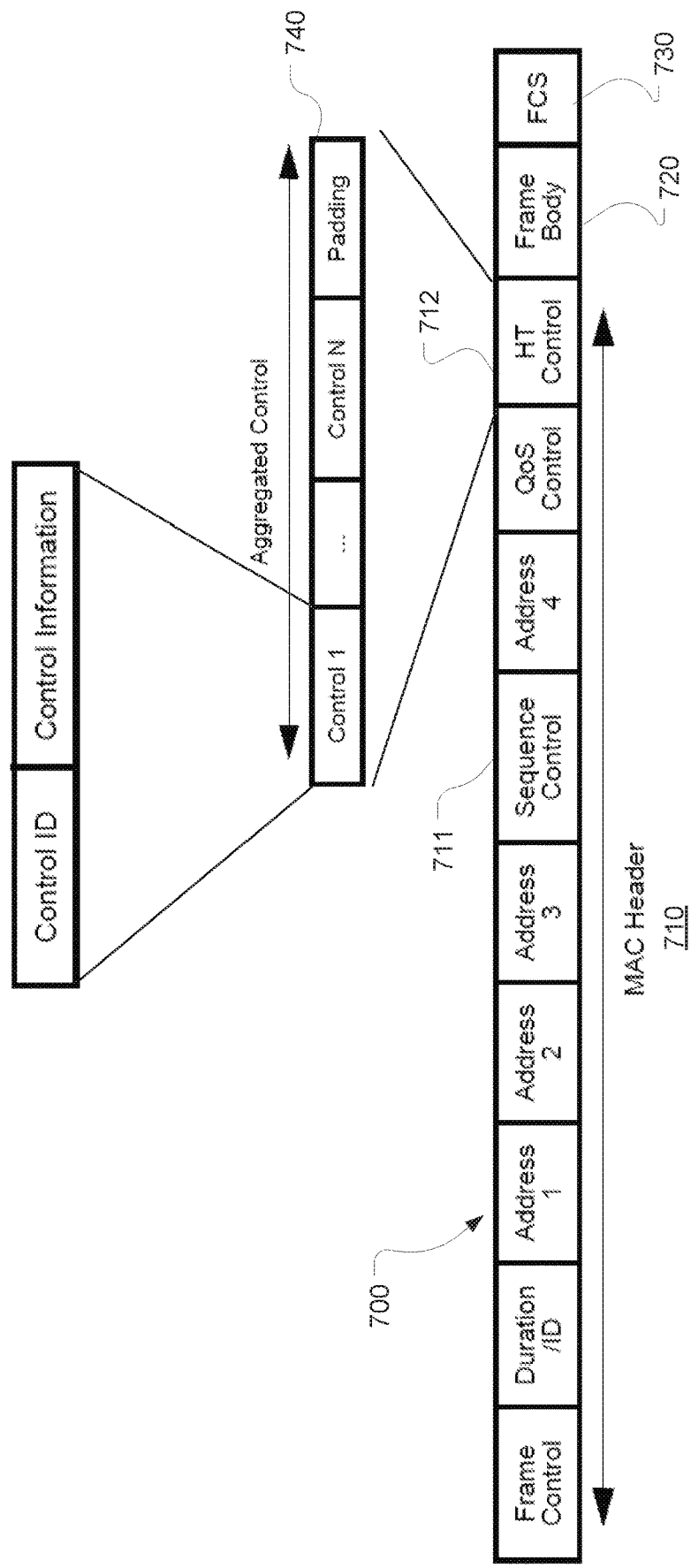
FIG. 7 shows an exemplary format of an MSDU with a sequence control field and an aggregated control (A-control) field defined to carry indications to avoid out-of-order delivery in a multi-band operation accordance with an embodiment of the present disclosure.

FIG. 7 shows an exemplary format of an MSDU 700 with a sequence control field and an aggregated control (A-control) field defined to carry indications to avoid out of order delivery in a multi-band operation accordance with an embodiment of the present disclosure. The MSDU 700 includes a MAC header, a frame body 720 and a frame check sequence (FCS) 730. The MAC header includes a sequence control field 711 and a HT control field 712, which has an aggregated control field 740. The aggregated control field 740 includes multiple control fields each including a control ID and control information.

In some case, the STAs maintain independent RSNAs, security keys, sequence counters, and/or PN counters for the multiple bands. For a receive STA to correctly receive frames from more than one sequence number space per TID, the A-Control field in the MAC header of the frames transmitted in multiple bands are used to carry the band information which indicates the operating band of the peer MAC entity associated with the frames. The receive STA may maintain receiver cache indexed by: <Address 2, TID, sequence number, fragment number, band information>, and the cache can be updated responsive to receiving a frame. The receive STA may use the sequence control field of the frames for sequence ordering of the band that is identified by the band information in the A-Control field. If the frames do not have the A-Control field containing the band information, the STA may assume that the frames are associated with the band on which the frames are received.

Figure 8A:
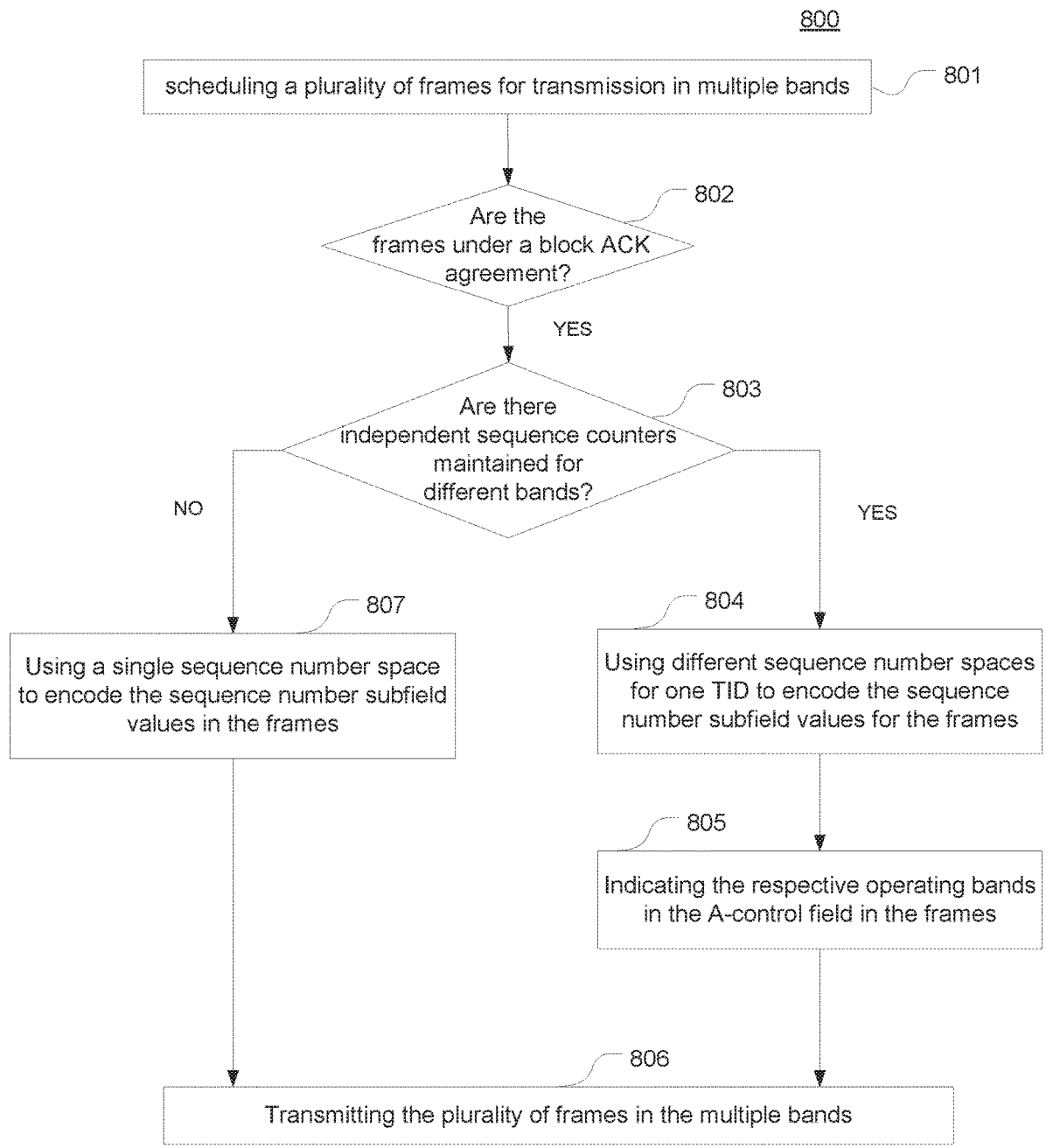
FIG. 8A is a flow chart depicting an exemplary process of configuring frames to be transmitted in a multi-band operation to avoid out-of-order delivery in accordance with a first embodiment of the present disclosure.

FIG. 8A is a flow chart depicting an exemplary process 800 of configuring frames to be transmitted in a multi-band operation to avoid out of order delivery in accordance with a first embodiment of the present disclosure. Process 800 may be performed by a multi-transceiver transmit STA. At 801, a plurality of frames are scheduled for transmission in multiple bands. At 802, it is determined whether the frames are under a block ACK agreement. If yes, at 803, it is further determined whether independent RSNAs, security keys, sequence counters, and/or PN counters are maintained for the multiple bands. If not, at 807, a single sequence number space is used to encode the sequence number subfield values of the frames. For example, the sequence number subfields in sequence control fields of the frames are set to consecutive values starting from the value in the starting sequence number subfield of the block ACK starting sequence control field in ADDBA Request frame. At 806, the frames are transmitted in the multiple bands.

On the other hand, if the STA maintains independent RSNAs, security keys, sequence counters, and/or PN counters for the multiple bands, at 804, different sequence number spaces are used to encode the sequence number subfield values for the frames of a TID. At 805, the A-control field of the MAC header of each frame is set to indicate the operating band information, e.g., band identifier. At 806, the frames are transmitted in the multiple bands.

Figure 8B:
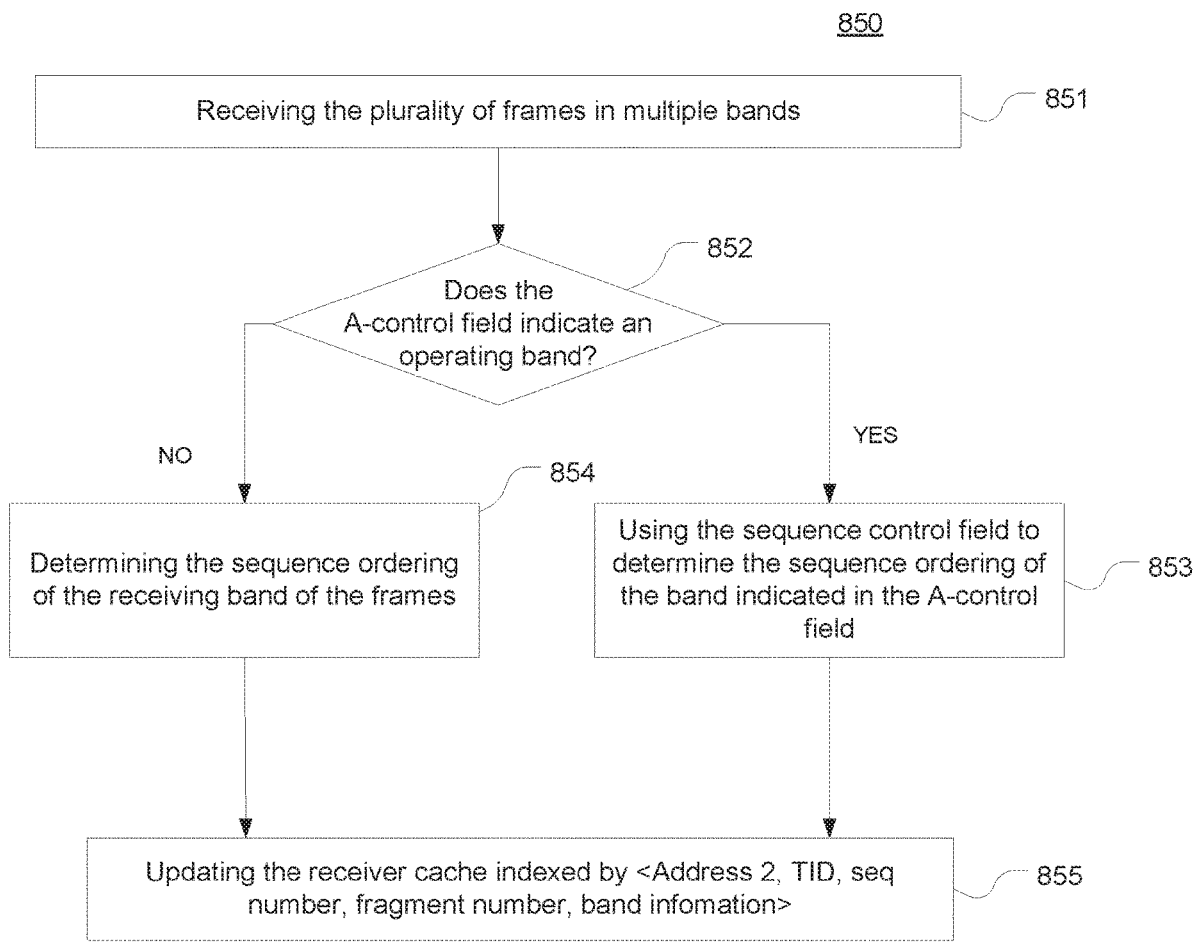
FIG. 8B is a flow chart depicting an exemplary process of resolving received frames that are transmitted in a multi-band operation and carry information used to avoid out-of-order delivery in accordance with the first embodiment of the present disclosure.

FIG. 8B is a flow chart depicting an exemplary process 850 of resolving received frames that are transmitted in a multi-band operation and carry information used to avoid out of order delivery in accordance with the first embodiment of the present disclosure. Process 850 may be performed by a receive STA. At 851, a plurality of frames under the same block ACK agreement are received in multiple bands and at the multiple transceivers. At 852, for each frame, the receive STA decides whether the A-control field indicates the operating band. If yes, at 853, the STA uses the information in the sequence control field to determine the sequence ordering of the band indicated by the A-control field. If the frames do not have the A-control field containing the band information, at 854, the STA assumes that the frames are associated with the band on which the frames are received to determine the sequence ordering. At 855, responsive to each received frame, the receive STA updates the receiver cache indexed by: <Address 2, TID, sequence number, fragment number, band information>.

In some other embodiments, for frames under the same block ACK agreement to be transmitted in multiple bands, the A-Control field in their MAC headers carries the band information and the sequence number information representing the frame order. For example, the band information identifies the band of the peer MAC entity to which the frames are addressed. In some embodiments, the sequence number information in the A-Control fields of the frames are consecutive values starting from the value of the starting sequence number subfield of the block ACK starting sequence control field in ADDBA request frame.

The receive STA may ignore the information in the sequence control field if the band indicated by the A-Control field is different from the receive band of the frames. Instead, the receive STA may use the sequence number information in the A-Control field of the frames for the sequence ordering.

For fragmented frames of a single MSDU that are to be transmitted in multiple bands, the A-Control field in the MAC header of the frames may carry the sequence number information and the fragment number information. The band information indicates the band of the peer MAC entity to which the frames are addressed. The sequence number in the A-Control field of each frame has the same value, and the fragment number in the A-Control field of the frames is set to a value representing its fragment position within the MSDU.

The receive STA may ignore the information in the sequence control field of a frame if the band indicated by the band information in the A-Control field is different from the receive band of the frames. Instead, it can use the sequence number information and the fragment number information in the A-Control field of the frames for defragment ordering.

Figure 9A:
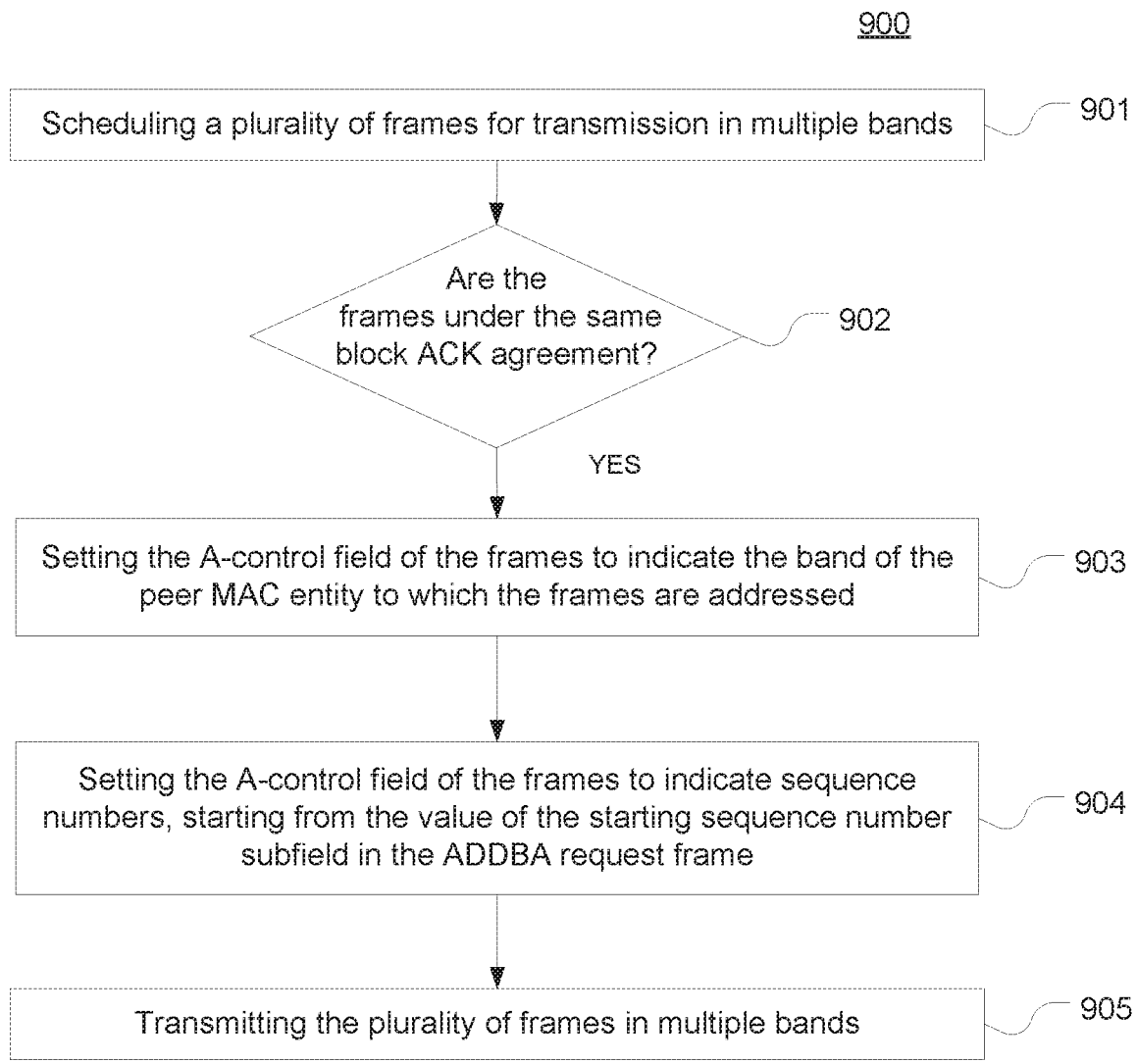
FIG. 9A is a flow chart depicting an exemplary process of configuring frames to be transmitted in a multi-band operation to avoid out-of-order delivery in accordance with a second embodiment of the present disclosure.

FIG. 9A is a flow chart depicting an exemplary process 900 of configuring frames to be transmitted in a multi-band operation to avoid out of order delivery in accordance with a second embodiment of the present disclosure. Process 900 may be performed by a transmit STA. At 901, a plurality of frames are scheduled to be transmitted in multiple bands. At 902, it is determined whether the frames are under the same ACK agreement. If yes, at 903, the A-control field of each frame is set to indicate the band of the peer MAC entity to which the frames are addressed. At 904, the A-control field of the frame is set to further indicate the sequence number. The sequence numbers for the frames start from the value in the starting sequence number subfield in the ADDBA request frame. At 905, the frames under the same block ACK agreement are transmitted in multiple bands.

FIG. 9B is a flow chart depicting an exemplary process 950 of resolving received frames that are transmitted in a multi-band operation and carry information used to avoid out of order delivery in accordance with the second embodiment of the present disclosure. Process 950 may be performed by a receive STA. At 951, a plurality of frames under the same block ACK agreement are received in multiple bands and at the multiple transceivers. At 952, for each frame, it is determined whether the band indicated in the A-control field is different from the receive band of the frame. If yes, at 953, the sequence number in the sequence control field in the frame is ignored, and rather the sequence number information in the A-control field is used for sequence ordering.

Figure 10:
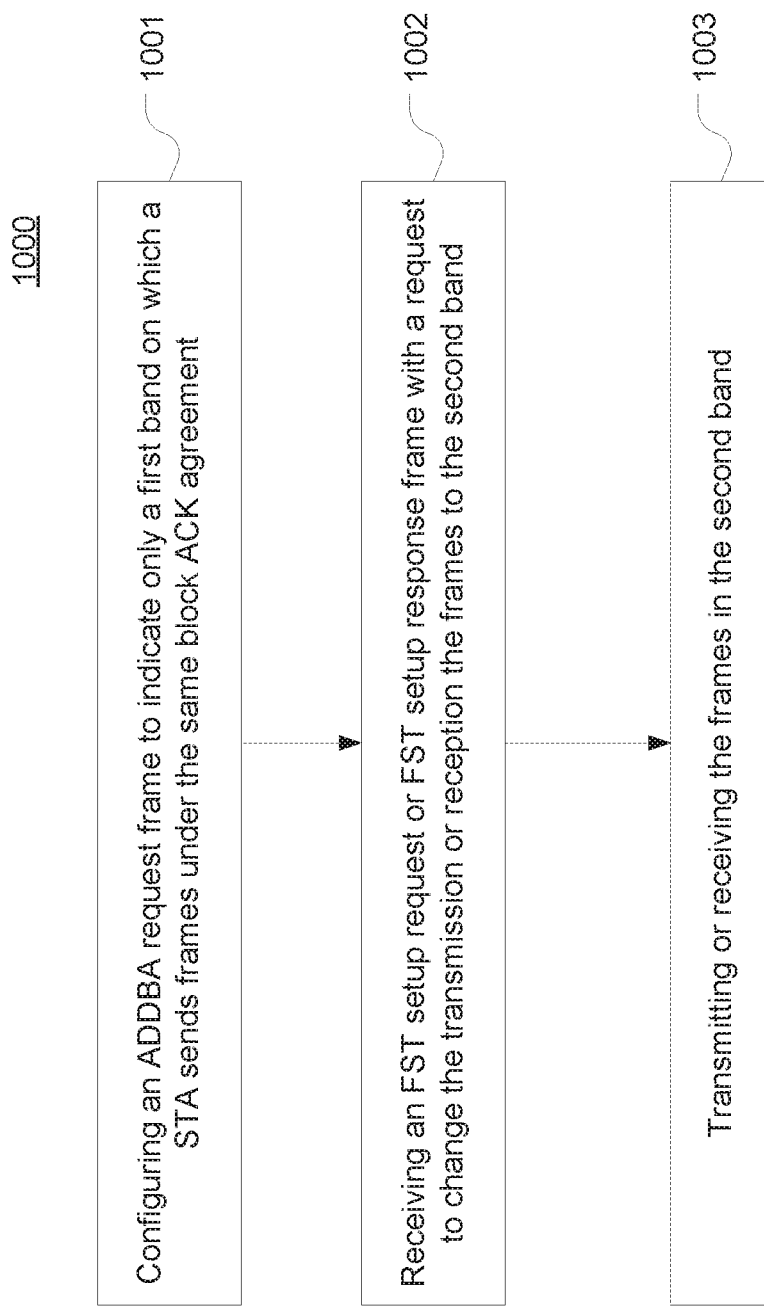
FIG. 10 is a flow chart depicting an exemplary process of specifying a band for transmitting frames under the same block ACK agreement in multi-transceiver STA in accordance with a third embodiment of the present disclosure.

In still some other embodiments, it is prescribed that frames under the same block ACK agreement be transmitted in the same band. Thus, the ADDBA request frame includes a single multi-band information element used to indicate the band on which the STA sends the frames, the TID of which is indicated in the ADDBA request frame. If an STA needs to change the band for transmission or reception, a fast session transfer (FST) setup request and an FST setup response may be exchanged between the STAs to negotiate or inform the change. FIG. 10 is a flow chart depicting an exemplary process 1000 of specifying a band for transmitting frames under the same block ACK agreement in multi-transceiver STA in accordance with a third embodiment of the present disclosure. Process 1000 may be performed by a transmit STA or a receive STA of the frames. At 1001, an ADDBA request frame is configured to indicate a single band (a first band) to be used for transmitting the frames under the same block ACK agreement. At 1002, a FST setup request for a FST setup response frame is received, which includes a request to change to a second band for transmitting or receiving the frames. At 1003, the frames are transmitted or received in the second band.

In a cooperative multi-band operation, a frame under no block ACK agreement may be first transmitted in a first band and then retransmitted in another band. A receive STA needs a mechanism to detect and filter out duplicate frames. If different sequence numbers are used on the multiple bands, the receive STA may not be able filter out the duplicate frames. Thus, in some embodiments, for a frame under no block ACK agreement, retransmission of the frame is limited to the same band used to transmit the initial frame.

In some other embodiments, for a frame under no block ACK agreement to be retransmitted in a different band, a single sequence number space is used in the multiple bands associated with the STA. Particularly, the sequence number subfield in sequence control field of the frames is set to the same value even though the frames are transmitted in different bands.

In still some other embodiments, an STA maintains separate and independent RSNAs, security keys, sequence counters, and/or PN numbers for the different bands. Thus, for a frame under no block ACK agreement to be retransmitted in a different band, the A-Control field in the MAC header of the frame is set to carry the sequence number information. This information is set to be same in the retransmitted frame as in the initial frame. The receive STA receiving a frame stores the information in the receiver cache and uses it for duplicate detection.

In a cooperative multi-band operation, an STA may receive duplicates of a group-addressed frame through the multiple bands, and thus the STA may undesirably deliver duplicated group-addressed frames for upper layer frame processing because duplicate detection is not usually performed on group-addressed frames. To avoid redundant group-addressed frame delivery, a new filtering mechanism is provided herein.

In some embodiments, when an STA establishes a cooperative multi-band operation with an AP, the STA identifies the band for receiving a group-addressed frame. Particularly, when the STA sends a request frame to establish the cooperative multi-band operation with the AP, it includes the band information in the request frame, which indicates a single band. When the AP has a group-addressed frame that is destined to the STA, it sends the group-addressed frame through the single band identified by the STA. The STA discards duplicates of the group-addressed frame received on the other bands.

In some embodiments, an AP that supports a cooperative multi-band operation may indicate the band on which it does not send a group-addressed frame. Alternatively, the AP can indicate the band on which it does send a group-addressed frame. The band for a group-addressed frame transmission from the AP can be identified in a beacon, a probe response, or (re)association response frames.

After an STA receives the information that the AP does not send a group-addressed frame on a particular band, and after it establishes a cooperative multi-band operation with the AP, the STA selects and identifies a band to receive a group-addressed frame from the eligible bands on which the AP can send a group-addressed frame.

In some embodiments, an STA establishes a cooperative multi-band operation with an AP where a single band is designated for a group-addressed frame transmission to the STA. In this case, the STA does not need to send to the AP a band identifier for reception of the group-addressed frame. The STA may preserve the frame received in the designated single band and discard the group-addressed frames received in the other bands.

If the STA has no preference on the band on which it can receive a group-addressed frame, the STA may not indicate the band information for a group-addressed frame reception. In this case, the AP and the STA are configured to implicitly assume the band on which they established the association as the band for group-addressed frame reception.

Figure 11:
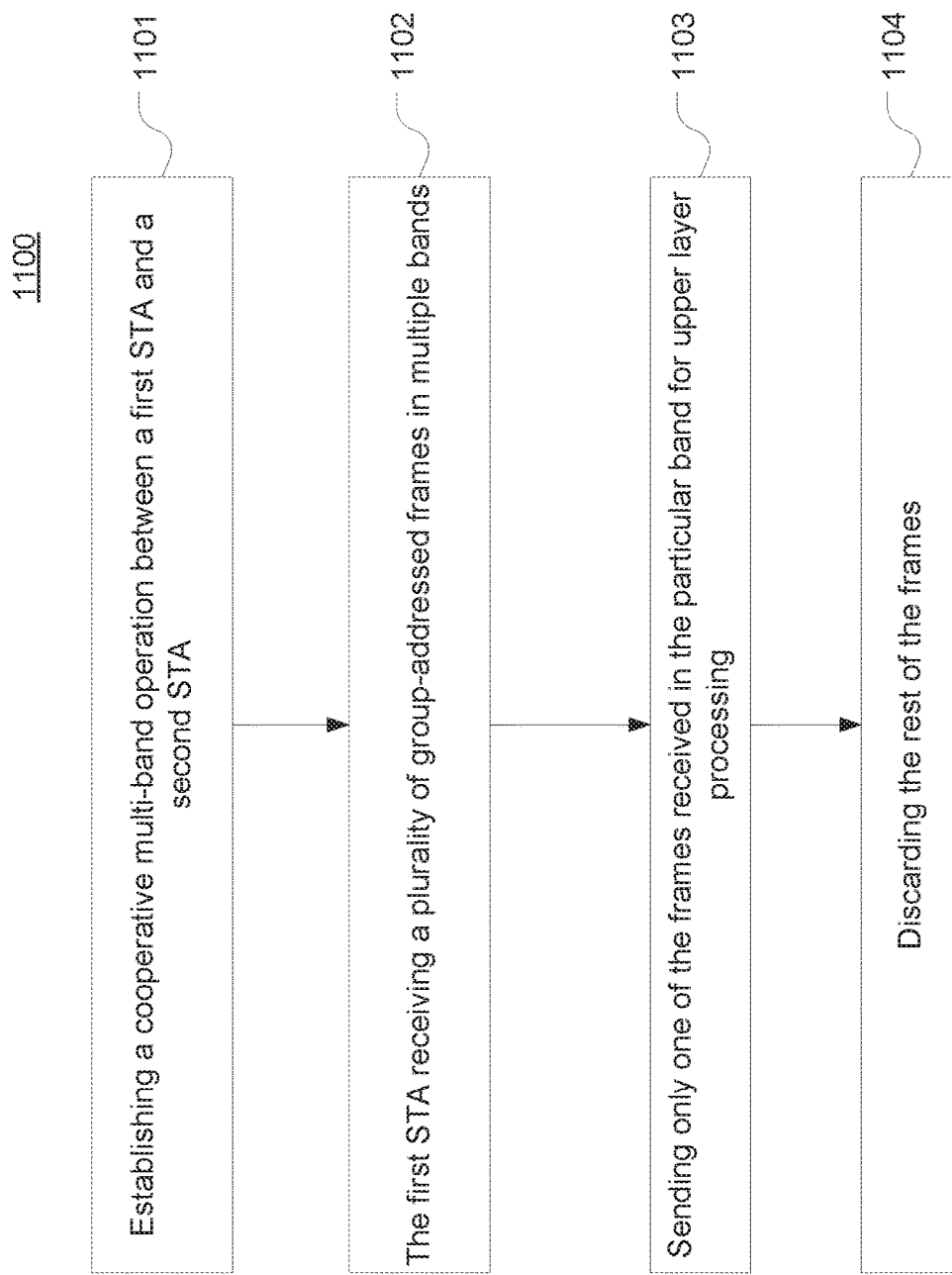
FIG. 11 is a flow chart depicting an exemplary computer implemented process of receiving group-addressed frames in a cooperative multi-band operation in accordance with an embodiment of the present disclosure.

FIG. 11 is a flow chart depicting an exemplary computer implemented process 1100 of receiving group-addressed frames in a cooperative multi-band operation in accordance with an embodiment of the present disclosure. At 1101, a cooperative multi-band operation is established between a first STA and a second STA, e.g., a non-AP STA and an AP STA. At 1102, the first STA receives multiple duplicates of a group-addressed frame transmitted in multiple bands. At 1103, the STA sends only the frame that is received in a particular band for upper level processing. At 1104, the STA discards the rest of the duplicate group-addressed frames.

In some other embodiments, when an AP sends a group-addressed frame to multiple bands, the duplicate group-addressed frames have the same sequence number. The AP sequentially sends the group-addressed frame across all the bands. For example, to send a group-addressed frame of a sequence number N, the AP needs to finish a group-addressed frame transmission of a sequence number N−1 over all bands. This can effectively and advantageously prevent out-of-order delivery.

The STA may maintain the receiver cache indexed by: <DA (Group address), TID, sequence number, fragment number>. When the STA receives the group-addressed frames in multiple bands, it can filter out duplicate group-addressed frames based on the receiver cache. In some embodiments, the STA may maintain multiple entries for multiple received frames.

Figure 12:
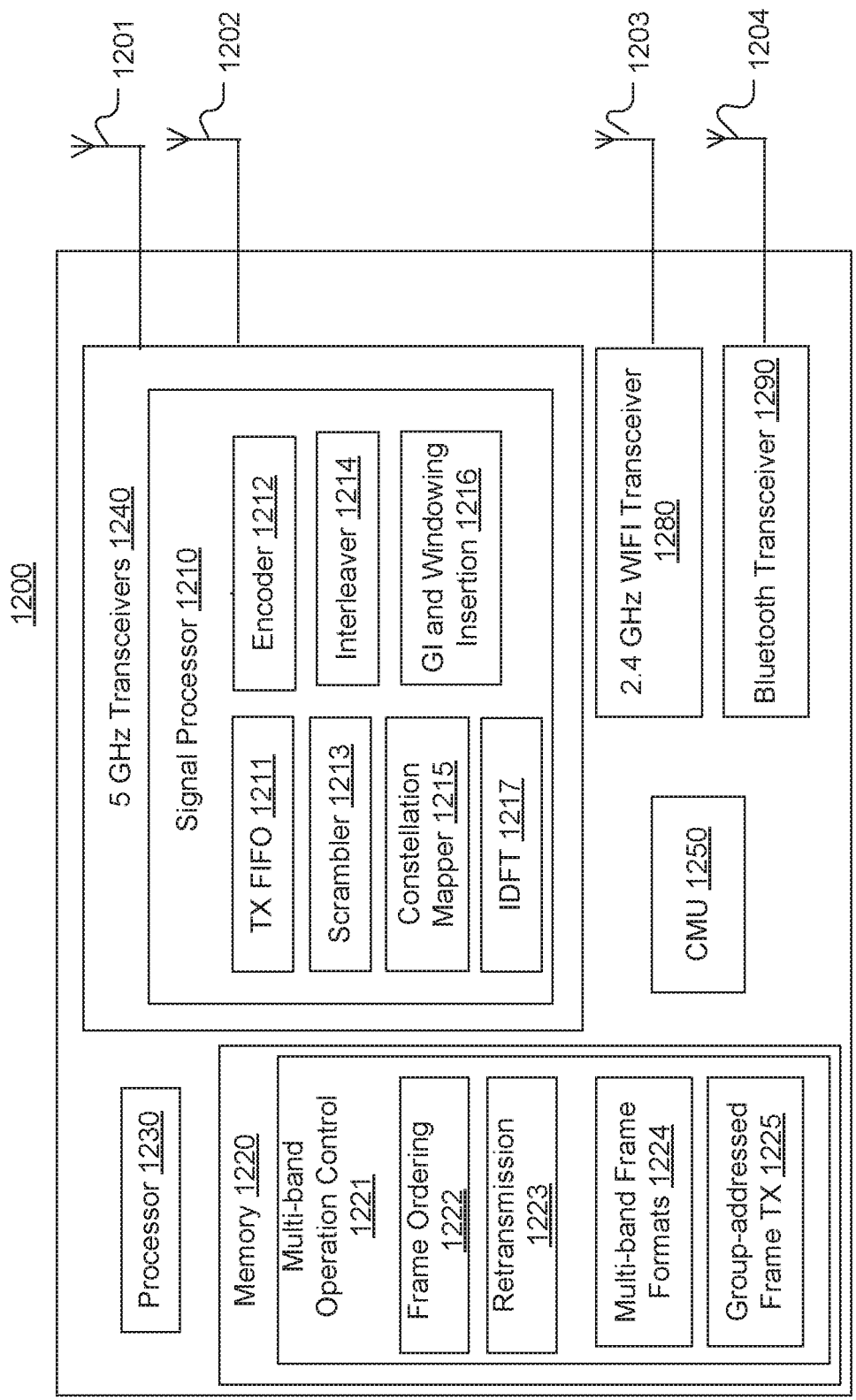
FIG. 12 is a block diagram illustrating an exemplary wireless communication device operable to perform cooperative multi-band operations in full duplex in accordance with an embodiment of the present disclosure.

FIG. 12 is a block diagram illustrating an exemplary wireless communication device 1200 operable to perform cooperative multi-band operations in full duplex in accordance with an embodiment of the present disclosure. The communication device 1200 may be an AP, a repeater, or a non-AP device, having a transceiver configured for data communication, e.g., a general purpose computer, a smart phone, a tablet wearable device, a sensor used on Internet of Things (IoT), and etc.

The device 1200 includes a main processor 1230, a memory 1220, a 5 GHz WLAN transceiver 1240 coupled to an array of antenna 1201-1202, a 2.4 GHz WLAN transceiver 1280 coupled to the antenna 1203, a Bluetooth transceiver 1290 coupled to the antenna 1204, and a CMU 1250. The CMU 1250 is configured to control and coordinate the cooperative multi-band operations among the transceivers 1240, 1280, 1290, for example by performing data fragmentation or data segregation, intra-STA information exchange, switching from using one transceiver to another, etc.

The CMU 1250 can control the transceivers 1240, 1280 and 1290 to operate in a primary-auxiliary manner or as peer transceivers with respect to a TXOP. The CMU 1250 may be implemented by using circuit hardware, software, firmware or a combination thereof, and may be controlled by the instructions stored in the memory 1220.

The memory 1220 includes a multi-band operation control module 1221 having instructions, configuration and information related to using the transceivers 1240, 1280 (and/or 1290) in multi-band TXOPs. Based on the information and instructions, the transceiver 640 may take corresponding actions with regard to TXOP.

A frame ordering module 1222 has instructions and information for determining a transmission order of frames to avoid out-of-order delivery, and for determining a frame order of received frames, in a multi-band operation based on various information, including block ACK agreements, band information, sequence number information, frame information and fragment number information, as described in greater detail above. A retransmission management module 1223 has instructions and information related to frame retransmission in a cooperative multi-band operation. A group-addressed frame transmission module 1225 has instruction and information related to group-addressed frame transmission, such as designation of one or more bands for a group-addressed frame and filtering out redundant duplicate. A frame format module 1224 stores various frame formats related to cooperative multi-band operations. It will be appreciated that the memory 1220 has various other modules related to cooperative multi-band operations, as well as other function modules that are well known in the art.

The transceiver 1240 includes various modules of the transmit path which are configured to generate data packets, control frames, or any other type of communication transmission units for transmission to another STA. For instance, the 5 GHz WLAN transceiver 1240 has a signal processor 1210 including a transmit First-In-First-Out (TX FIFO) 1211, an encoder 1212, a scrambler 1213, an interleaver 1214, a constellation mapper 1215, a GI and windowing insertion module 1216, and an inversed discrete Fourier transformer (IDFT) 1217. The transceiver 1240 also includes various modules of a receive path configured to receive data packets, control frames, or any other type of communication transmission units from another STA. The WLAN transceiver 1280 may have a similar configuration as the transceiver 1240. The Bluetooth transceiver 1290 may be implemented in any suitable manner that is well known in the art. As noted above, one or more of any other types of wireless transceivers that are well known in the art can be integrated in the device 1200 and perform cooperative multi-band operations to enable the device to communicate with the other device in a full duplex manner.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication performed by a first wireless station (STA) comprising at least a first transceiver and a second transceiver respectively associated with a first band and a second band, the method comprising:
   transmitting a first frame in said first band, wherein said first frame is associated with a traffic identifier (TID);
   scheduling a first plurality of frames for transmission;
   during transmission of said first frame, selecting a first next frame from said first plurality of frames for transmission in said second band, wherein said selecting comprises at least one of:
      responsive to a determination that the first frame is under a block acknowledgment (ACK) agreement, selecting a frame with a same or different TID as said first frame as said first next frame; and
      responsive to a determination that the first frame is not under a block ACK agreement, selecting a frame with a same or different TID than said first frame as said first next frame; and
   transmitting said first next frame in said second band.

2. The method of claim 1, further comprising:
   transmitting a second frame in said first band, wherein said second frame is under a block acknowledgement agreement;
   scheduling a second plurality of frames for transmission;
   during transmission of said second frame, selecting a second next frame from said second plurality of frames for transmission in said second band, wherein said selecting comprises, responsive to a determination that said reordering buffer is available, selecting a frame with a same or different TID as said second frame as said second next frame; and
   transmitting said second next frame in said second band.

3. The method of claim 1 further comprising transmitting an add block acknowledgement (ADDBA) request frame comprising multi-band information elements that specify: a plurality of TIDs of multiple frames; and a band corresponding to each of said plurality of TIDs.

4. The method of claim 1 further comprising:
   transmitting a third frame in said first band;
   scheduling a third plurality of frames for transmission;

during transmission of said third frame, selecting a third next frame from said third plurality of frames for transmission in said second band, wherein said selecting comprises, responsive to a determination that said third frame is under no block acknowledgement agreement, selecting a frame with a same or different TID than said third frame as said third next frame; and transmitting said third next frame in said second band.

5. The method of claim 1 further comprising:

transmitting a fourth frame in said first band, wherein said fourth frame is under no block acknowledgement agreement;

scheduling a fourth plurality of frames for transmission;

during transmission of said fourth frame, selecting a fourth next frame from said fourth plurality of frames for transmission in said second band, wherein said selecting comprises, responsive to a determination that said fourth frame has no further retry, selecting a frame with a same or different TID as said fourth frame as said fourth next frame, wherein a transmission end time of said fourth next frame is not earlier than a transmission end time of said fourth frame; and transmitting said fourth next frame in said second band.

6. The method of claim 1 further comprising:

transmitting a fifth frame in said first band, wherein said fifth frame is under no block acknowledgement agreement;

scheduling a fifth plurality of frames for transmission;

during transmission of said fifth frame, selecting a fifth next frame from said fifth plurality of frames for transmission in said second band, wherein said selecting comprises, responsive to a determination that said fifth frame has a following entry, selecting a frame with a same or different TID as said fifth frame as said fifth next frame; and transmitting said fifth next frame in said second band.

7. The method of claim 6, wherein a transmission end time of said fifth next frame is earlier than, or same as, a transmission end time of said fifth frame.

8. The method of claim 1 further comprising:

transmitting a fragmented frame of a sixth frame in said first band;

scheduling a sixth plurality of frames for transmission;

during transmission of said fragmented frame, selecting a sixth next frame from said sixth plurality of frames for transmission in said second band, wherein said selecting comprises selecting from a remaining fragment frame of said sixth frame as said next frame; and transmitting said sixth next frame in said second band.

9. A wireless stations (STA), comprising:

a processor;

a first transceiver associated with a first band; and a second transceiver associated with a second band, wherein the processor performs a method for transmitting data wirelessly over the first band and the second band, the method comprising:

transmitting a first frame in said first band, wherein said first frame is associated with a traffic identifier (TID);

scheduling a first plurality of frames for transmission;

during transmission of said first frame, selecting a first next frame from said first plurality of frames for transmission in said second band, wherein said selecting comprises at least one of:

response to a determination that the first frame is under a block acknowledgment (ACK) agreement, selecting a frame with a same or different TID as said first frame as said first next frame; and responsive to a determination that the first frame is not under a block ACK agreement, selecting a frame with a same or different TID than said first frame as said first next frame; and; and transmitting said first next frame in said second band.

10. The wireless station of claim 9, wherein the method further comprises:

transmitting a second frame in said first band, wherein said second frame is under a block acknowledgement agreement;

scheduling a second plurality of frames for transmission;

during transmission of said second frame, selecting a second next frame from said second plurality of frames for transmission in said second band, wherein said selecting comprises, responsive to a determination that said reordering buffer is available, selecting a frame with a same or different TID as said second frame as said second next frame; and transmitting said second next frame in said second band.

11. The wireless station of claim 9, wherein the method further comprises transmitting an add block acknowledgement (ADDBA) request frame comprising multi-band information elements that specify: a plurality of TIDs of multiple frames; and a band corresponding to each of said plurality of TIDs.

12. The wireless station of claim 9, wherein the method further comprises:

transmitting a third frame in said first band;

scheduling a third plurality of frames for transmission;

during transmission of said third frame, selecting a third next frame from said third plurality of frames for transmission in said second band, wherein said selecting comprises, responsive to a determination that said third frame is under no block acknowledgement agreement, selecting a frame with a same or different TID than said third frame as said third next frame; and transmitting said third next frame in said second band.

13. The wireless station of claim 9, wherein the method further comprises:

transmitting a fourth frame in said first band, wherein said fourth frame is under no block acknowledgement agreement;

scheduling a fourth plurality of frames for transmission;

during transmission of said fourth frame, selecting a fourth next frame from said fourth plurality of frames for transmission in said second band, wherein said selecting comprises, responsive to a determination that said fourth frame has no further retry, selecting a frame with a same or different TID as said fourth frame as said fourth next frame, wherein a transmission end time of said fourth next frame is not earlier than a transmission end time of said fourth frame; and transmitting said fourth next frame in said second band.

14. The wireless station of claim 9, wherein the method further comprises:

transmitting a fifth frame in said first band, wherein said fifth frame is under no block acknowledgement agreement;

scheduling a fifth plurality of frames for transmission;

during transmission of said fifth frame, selecting a fifth next frame from said fifth plurality of frames for transmission in said second band, wherein said selecting comprises, responsive to a determination that said fifth frame has a following entry, selecting a frame with a same or different TID as said fifth frame as said fifth next frame; and transmitting said fifth next frame in said second band.

15. The wireless station of claim 14, wherein a transmission end time of said fifth next frame is earlier than, or same as, a transmission end time of said fifth frame.

16. The wireless station of claim 9, wherein the method further comprises:

transmitting a fragmented frame of a sixth frame in said first band;

scheduling a sixth plurality of frames for transmission;

during transmission of said fragmented frame, selecting a sixth next frame from said sixth plurality of frames for transmission in said second band, wherein said selecting comprises selecting from a remaining fragment frame of said sixth frame as said next frame; and transmitting said sixth next frame in said second band.

* * * * *